United States Patent
Yamada et al.

(10) Patent No.: US 8,393,664 B2
(45) Date of Patent: Mar. 12, 2013

(54) REAR BAGGAGE-COMPARTMENT STRUCTURE OF VEHICLE

(75) Inventors: Daisuke Yamada, Hiroshima (JP); Isao Hirayama, Hiroshima (JP); Naohiro Yamaguchi, Hiroshima (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 13/551,411

(22) Filed: Jul. 17, 2012

(65) Prior Publication Data
US 2013/0020825 A1    Jan. 24, 2013

(30) Foreign Application Priority Data
Jul. 22, 2011   (JP) ................. 2011-160390

(51) Int. Cl.
*B60J 7/00* (2006.01)
(52) U.S. Cl. .................................... 296/37.16
(58) Field of Classification Search ................. 296/37.8, 296/37.16
See application file for complete search history.

(56) References Cited

U.S. PATENT DOCUMENTS
7,815,235 B2 * 10/2010 Hayashi et al. ............... 296/24.4
7,963,580 B2 *  6/2011 Plettrichs et al. .......... 296/37.16

FOREIGN PATENT DOCUMENTS
JP    2000-108787 A    4/2000

* cited by examiner

*Primary Examiner* — Joseph Pape
(74) *Attorney, Agent, or Firm* — Studebaker & Brackett PC; Donald R. Studebaker

(57) ABSTRACT

A winding device is provided behind a rearmost-row seat and extends in a vehicle width direction to wind up a tonneau cover member. The tonneau cover member comprises a cover body portion and a board portion connected to a rear end of the cover body portion and has its rear end portion capable of engaging with an engaged portion of a lift gate. The lift gate further includes a pair of restraint portions at a specified position of both end portions of the inner face thereof which is located above the engaged portion, which is operative to restrain the cover body portion from moving upward when the lift gate is fully open and the tonneau cover member engages with the lift gate through a contact thereof with the board portion to stop further upward moving of the board portion.

4 Claims, 4 Drawing Sheets

REAR BAGGAGE-COMPARTMENT STRUCTURE OF VEHICLE

BACKGROUND OF THE INVENTION

The present invention relates to a rear baggage-compartment structure of a vehicle which comprises a baggage compartment provided at a vehicle-body rear portion, an opening portion formed at a vehicle-body rear face, a lift gate pivotally supported at an upper edge of the opening portion so as to close or open the opening portion, and a tonneau cover member provided so as to cover the baggage compartment from above.

In a conventional rear baggage-compartment structure of a vehicle, a tonneau cover member is provided to open or close in accordance with an opening/closing operation of a lift gate, and baggage can be loaded into or unloaded from a baggage compartment by moving the tonneau cover member upward when the lift gate is open.

Herein, it may be necessary that the width of the tonneau cover member is set to be substantially equal to the length, in a vehicle width direction, of a lower portion of the opening portion formed at the vehicle-body rear face in order to have the tonneau cover member surely cover over the baggage in the baggage compartment when the lift gate is closed. However, in a case of an automotive vehicle having an opening portion which is of a trapezoid shape with its upper edge portion shorter than its lower edge portion, for example, there is a concern that both end portions of the tonneau cover member may improperly interfere with rear pillars of the vehicle when the lift gate is fully open.

Japanese Patent Laid-Open publication No. 2000-108787 discloses a structure in which the board member is provided behind the rearmost-row seat and the winding device to wind up the tonneau cover member is provided at the rear portion of the board member. According to this structure, since the winding device can be located rearward by a longitudinal length of the board member, it can be properly restrained that the both end portions of the tonneau cover member interfere with the rear pillars when the lift gate is fully open.

However, since the structure disclosed in the above-described patent document comprises the board member, there are problems in that the structure may be improperly complex and costs increase may be caused, and also appearances and baggage loading may deteriorate.

SUMMARY OF THE INVENTION

The present invention has been devised in view of the above-described problems, and an object of the present invention is to provide a rear baggage-compartment structure of a vehicle which can properly prevent the tonneau cover member from interfering with the rear pillars when the lift gate is fully open with a simple structure.

According to the present invention, there is provided a rear baggage-compartment structure of a vehicle, comprising a baggage compartment provided at a vehicle-body rear portion, an opening portion formed at a vehicle-body rear face, a lift gate pivotally supported at an upper edge of the opening portion so as to close or open the opening portion, a tonneau cover member provided so as to cover the baggage compartment from above, and a winding device provided behind a rearmost-row seat and extending in a vehicle width direction, the winding device being operative to wind up the tonneau cover member, wherein the lift gate includes an engaged portion at an inner face thereof, the tonneau cover member comprises a cover body portion and a board portion which is connected to a rear end of the cover body portion and has a rear end portion thereof capable of engaging with the engaged portion of the lift gate, and the lift gate further includes a pair of restraint portions at a specified position of both end portions of the inner face thereof which is located above the engaged portion, the pair of restraint portions being operative to restrain the cover body portion of the tonneau cover member from moving upward when the lift gate is fully open and the tonneau cover member engages with the lift gate through a contact thereof with the board portion of the tonneau cover member to stop further upward moving of the board portion.

According to the present invention, when the lift gate is fully open and the tonneau cover member engages with the lift gate, the board portion contacts the restraint portions provided at the specified position of the both end portions of the inner face of the lift gate which is located above the engaged portion to stop further upward moving of the board portion, so that the cover body portion of the tonneau cover member can be restrained from moving upward. Accordingly, the shape of the tonneau cover member changes to a substantially L shape in a vehicle side view when the lift gate is fully open, so that the cover body portion of the tonneau cover member goes away from the rear pillars properly. Thus, the tonneau cover member can be properly prevented from interfering with the rear pillars when the lift gate is fully open with a properly simple structure.

According to an embodiment of the present invention, the restraint portion is a protruding portion integrally formed at a lift gate trim. Thereby, forming and appearances of the restraint portion can be improved.

According to another embodiment of the present invention, the board portion of the tonneau cover member includes a pair of resin-made contact portions at both end portions thereof which contacts the pair of restraint portions when the lift gate is fully open and the tonneau cover member engages with the lift gate. Thereby, the pair of resin-made contact portions provided at the both end portions of the board portion of the tonneau cover member contact the above-described restraint portions to stop further upward moving of the board portion, so that the cover body portion of the tonneau cover member can be restrained from moving upward. Accordingly, a stable contact-strength can be provided by the resin-made contact portions having a relatively high rigidity so that the upward-moving restraint of the cover body portion of the tonneau cover member can be stabilized.

Other features, aspects, and advantages of the present invention will become apparent from the following description which refers to the accompanying drawings.

DETAILED DESCRIPTION OF THE INVENTION

Hereinafter, a preferable embodiment of the present invention will be described referring to the accompanying drawings.

The present embodiment shows an example in which the present invention is applied to a rear baggage-compartment structure of a vehicle, such as a hatchback, ban, or wagon types of automotive vehicle, where a baggage compartment having a relatively-long longitudinal length is provided behind a seatback of a rearmost-row seat, which is equipped with a tonneau cover device covering over baggage placed in the baggage compartment from above.

Figure 1:
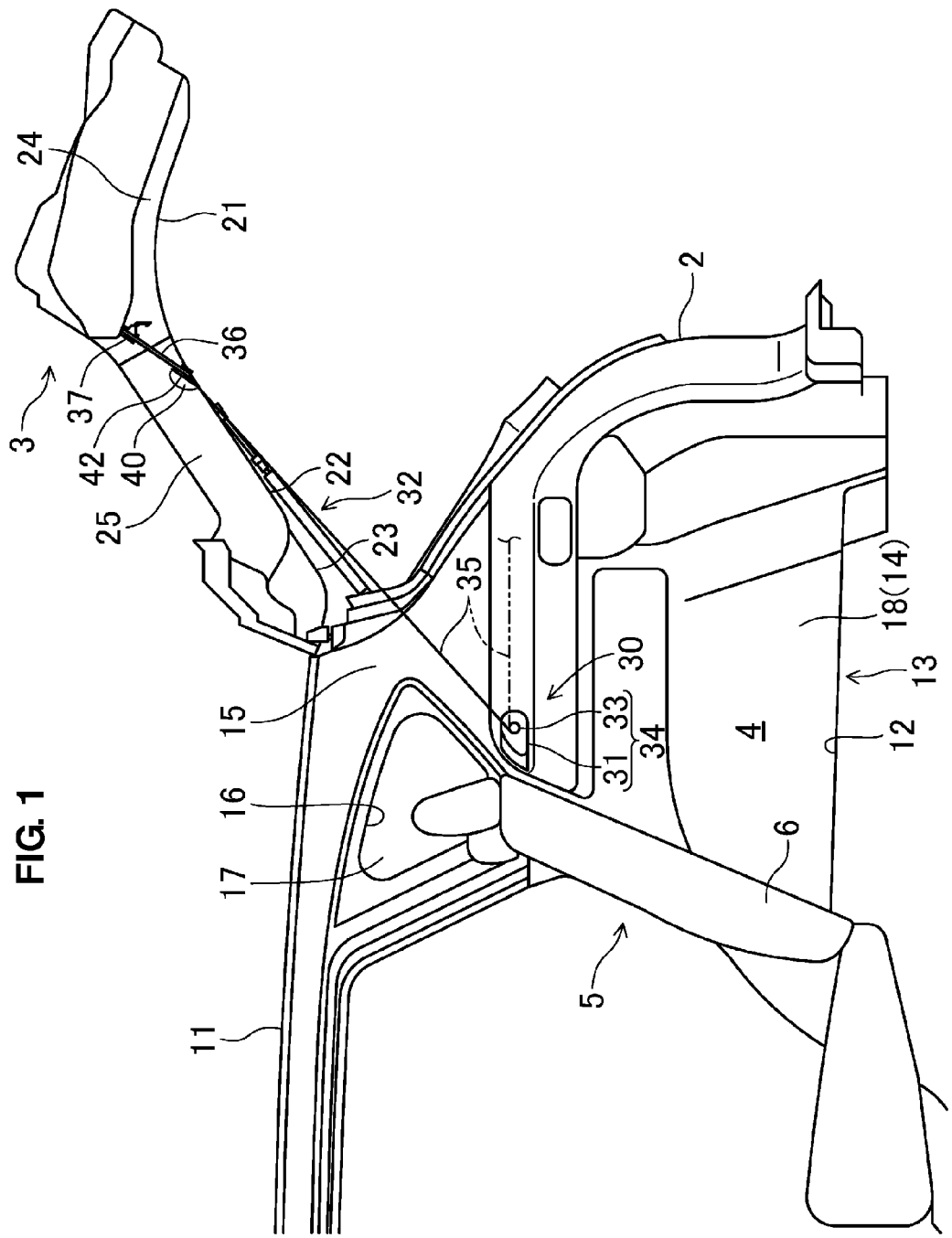
FIG. 1 is a partial sectional view of a rear baggage-compartment structure of a vehicle according to an embodiment of the present invention, when viewed from the side.
Figure 2:
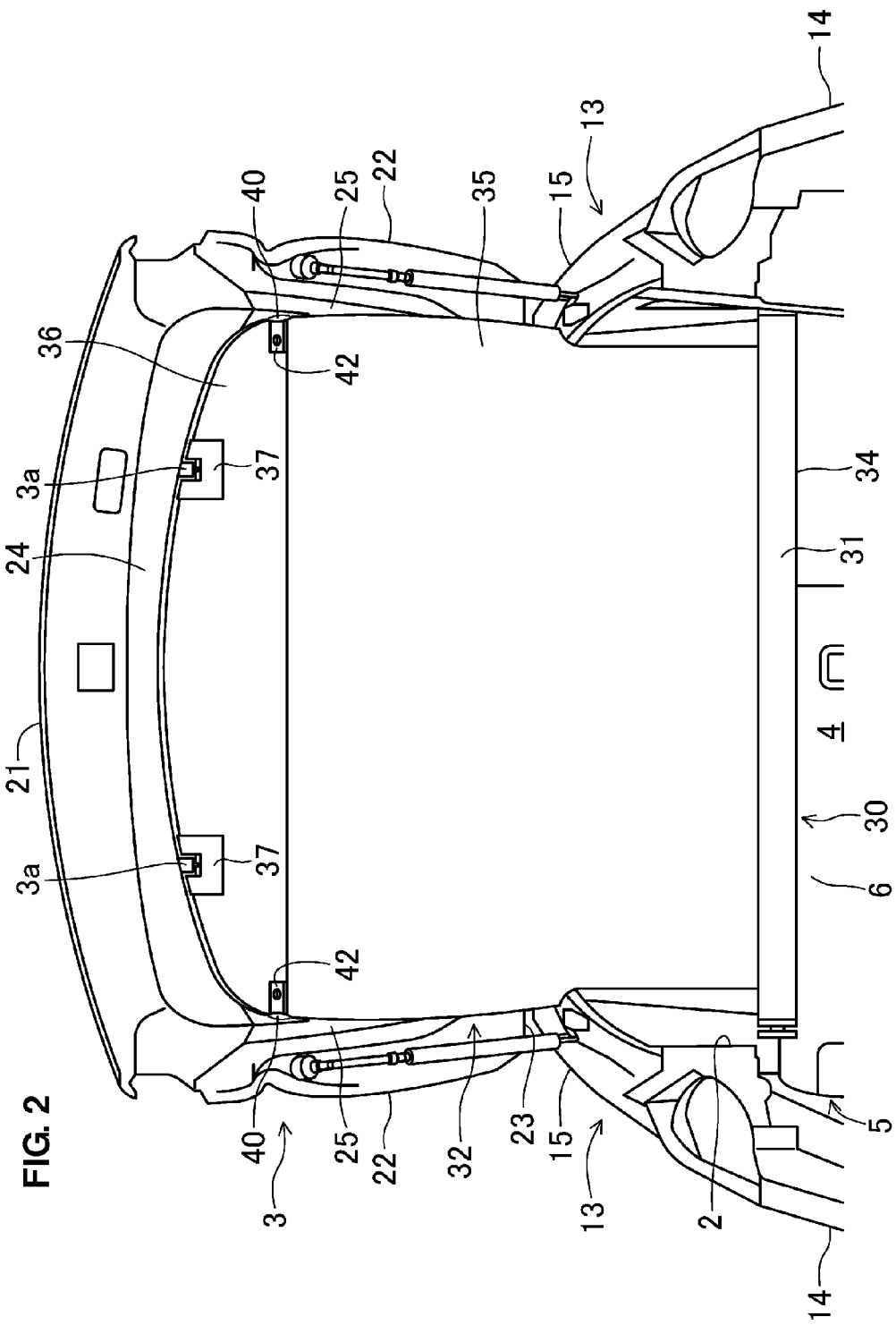
FIG. 2 is a back view showing the rear baggage-compartment structure of the vehicle when a lift gate is fully open and a tonneau cover member engages with the lift gate.
Figure 3:
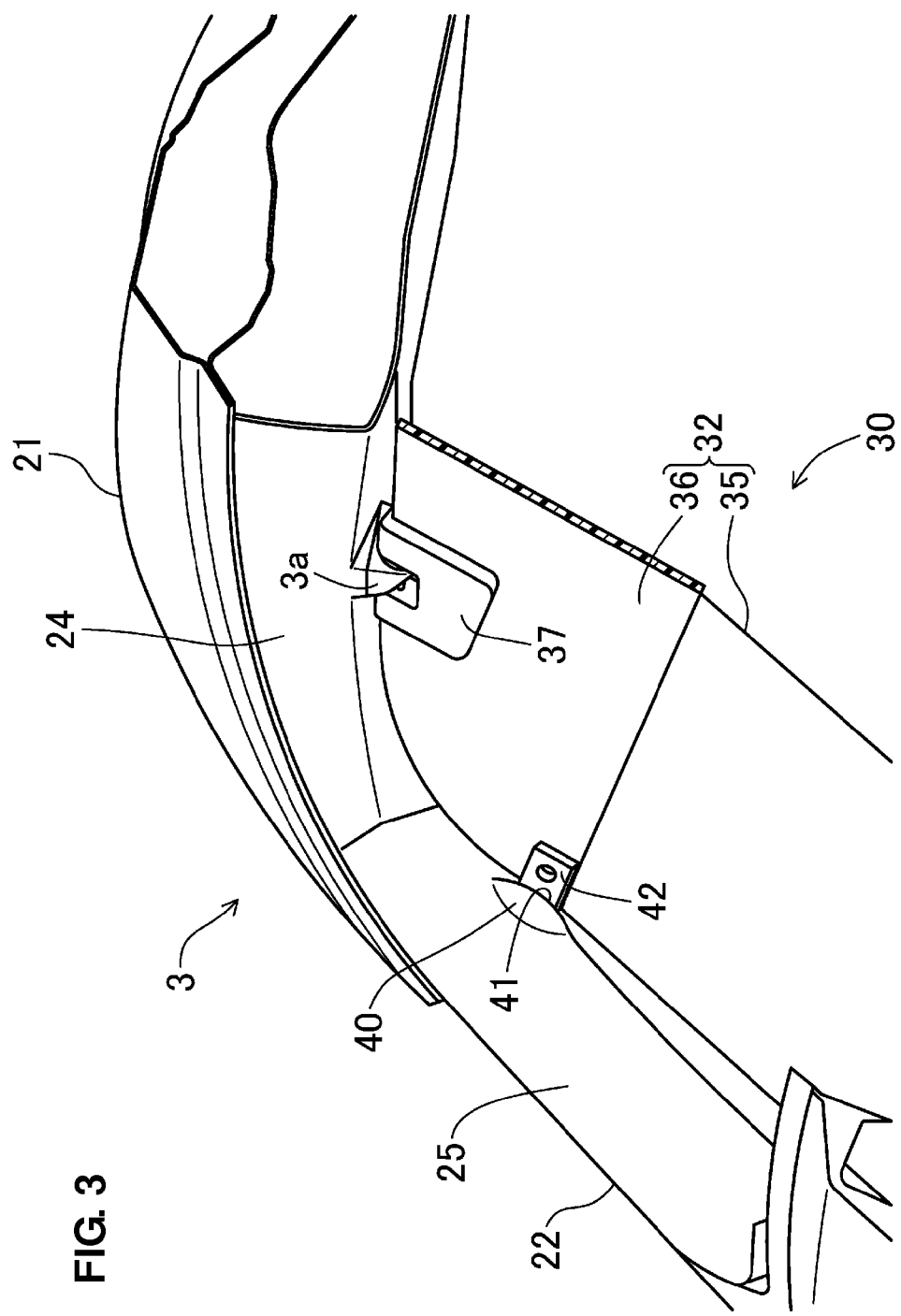
FIG. 3 is a back perspective view showing a major part of the rear baggage-compartment structure of the vehicle when the lift gate is fully open and the tonneau cover member engages with the lift gate.

As shown in FIGS. 1-3, at a rear portion of the automotive vehicle are provided an opening portion 2 formed at a vehicle-body rear face which is of a substantially trapezoid shape with its upper edge portion shorter than its lower edge portion, a lift gate (backdoor) 3 pivotally supported at a hinge portion near the upper edge of the opening portion 2 so as to close or open the opening portion 2, a baggage compartment 4 provided in front of the opening portion 2, a rearmost-row seat 5 provided in front of the baggage compartment 4, a tonneau cover member device 30 provided behind a seatback 6 of the rearmost-row seat 5, and others.

Next, the lift gate 3 will be described. The lift gate 3 comprises a lower wall 21, right and left side walls 22, 22, and an upper wall 23. The lower wall 21 rises up (extends upward) to a substantially half level of the automotive vehicle. Each side wall 22 slants obliquely forward and upward. The upper wall 23 extends in a vehicle width direction between respective upper end portions of the both side walls 22, 22. The lower wall 21, the side walls 22, and the upper wall 23 form together an opening for lift gate window, and a lift-gate window is provided at this opening. Resin-made trims are provided at the lower wall 21, the side walls 22, and the upper wall 23 at their vehicle-front sides (vehicle insides). Thus, a lower-wall trim 24, a side-wall trim 25, and an upper-wall trim form together a lift-gate trim.

Next, the baggage compartment 4 will be described. The baggage compartment 4 is partitioned by a roof 11 and a floor panel 12 at its upper and lower sides. A rear edge portion of the roof 11 forms the upper edge portion of the above-described opening portion 2. The floor panel 12 extends horizontally over a whole rage of the baggage compartment 4. A rear edge portion of the floor panel 12 forms the lower edge portion of the above-described opening portion 2.

The baggage compartment 4 is also partitioned by right and left rear side walls 13, 13 of the vehicle-body rear portion at its both sides. Each rear side wall 13 comprises a lower side wall 14 and a rear pillar 15. Each lower side wall 14 rises up to the substantially half level of the automotive vehicle from the floor panel 12. Each rear pillar 15 rises from a rear upper portion of the lower side wall 14. The rear pillar 15 slants obliquely forward and upward. The rear pillar 15 of the rear side wall 13 supports a rear portion of the roof 11. Meanwhile, the lower side wall 14, the rear pillar 15, and the roof 11 form together an opening for rear quarter window 16, and a rear-quarter window 17 is provided at this opening 16.

Resin-made trims are provided at the lower side wall 14 and the rear pillar 15 at their vehicle insides. A lower side-wall trim 18 has a recess for case which is formed at a position thereof just behind an upper end portion of the seatback 6 of the rearmost-row seat 5. The rear pillar trim and the rear pillar 15 form together a side edge portion of the above-described opening 2.

The baggage compartment 4 is partitioned by the rearmost-row seat 5 and the lift gate 3 at its front and rear sides. The rearmost-row seat 5 is provided on the floor panel 12.

Hereinafter, the tonneau cover device 30 will be described. The tonneau cover member 30 comprises a storage case 31 which is provided just behind the upper end portion of the seatback 6, a tonneau cover member 32 which has a rear end portion thereof capable of engaging with an inner face portion of the lift gate 3, and others.

The storage case 31 extends in the vehicle width direction between the rear side faces 13, 13, and its both end portions are held in the above-described recess portion for case of the lower side-wall trims 18, 18. A winding mechanism 33 operative to bias a cover body portion 35 of the tonneau cover member 32 in a winding direction is arranged in the storage case 31 to extend in the vehicle width direction. A front end portion of the tonneau cover member 32 is rotatably supported at the winding mechanism 33. The storage case 31 and the winding mechanism 33 constitute a winding device 34 which is arranged to extend in the vehicle width direction just behind the rearmost-row seat 5 and operative to wind up the tonneau cover member 32. The cover body portion 35 is expandable in the vehicle longitudinal direction by a tension applied to the cover body portion 35 which is caused by a biasing force of the winding mechanism 33.

The tonneau cover member 32 comprises the cover body portion 35 which is made of an elastic material, a resin-made board portion 36 which is connected to a rear end of the cover body portion 35 so as to rotate around an axis extending in the vehicle width direction and hangs down from the winding device 34 when the tonneau cover member 32 is wound up by the winding device 34, and others. Herein, the width of the tonneau cover member 32 is configured to be longer than that of the upper edge portion of the opening portion 2 formed at the vehicle-body rear face and substantially equal to the length of a lower portion of the opening portion 2.

An outer peripheral shape of the board portion 36 is comprised of a substantially arc shape and a straight line. Engaging portions 37 are provided at both-side end portions of a rear portion of the board portion 36, respectively. These engaging portions 37 engage with engaged portions 3a of the lift gate 3 which are provided near a lower edge of the lift gate window at both-side end portions of the lower-wall trim 24, so that the tonneau cover member 32 moves upward or downward in accordance with the opening or closing of the lift gate 3.

As described above, since the tonneau cover member 32 includes the board portion 36 connected to the rear end of the cover body portion 35, the strength of the rear-side portion of the tonneau cover member 32 can be increased. Accordingly, the engaging portions 37 for connecting the tonneau cover member 32 to the lift gate 3 can be attached to the board portion 36, the sufficient strength can be provided to the tonneau cover member 32 even in a case in which the rear end portion of the tonneau cover member 32 is pulled backward when the lift gate 3 is open.

The lift gate 3 further includes a pair of restraint portions 40 at a specified position of both end portions of the inner face thereof which is located above the engaged portions 3a (herein, it should be noted that the restraint portions 40 being positioned above the engaged portions 3a means a positional relationship of the restraint portions 40 and the engaged portions 3a relative to the lift gate 3 in its closed state, therefore, in other words, the restraint portions are positioned on an upper-edge side of the lift gate 3 from the engaged portions 3a). The restraint portions 40 are operative to restrain the rear-end side of the cover body portion 35 of the tonneau cover member 32 from moving upward and forward when the lift gate 3 is fully open and the tonneau cover member 32 engages with the lift gate 3 through a contact thereof with the board portion 36 to stop further upward and forward (toward an outer-face side of the lift gate 3) moving of the front-end side of the board portion 36. That is, the restraint portions 40 restrain the board portion 36 from rotating upward (clockwise in FIG. 1) around an rotational axis which is located at an engagement portion of the engaging portions 37 with the engaged portions 3a and extends in the vehicle width direction. Thereby, the cover body portion 35 is restrained from rotating upward (counterclockwise in FIG. 1) around an axis of the winding device 33 extending in the vehicle width direction. As described above, since the rear-end side of the cover body portion 35 is restrained by the restraint portions 40 from moving upward and forward, the shape of the tonneau cover member 32 changes to a substantially L shape in the vehicle side view in which the connection portion of the cover body portion 35 and the board portion 36 projects downward and backward. Each restraint portion 40 is a resin-made protruding portion which is integrally formed at an inside portion, in the vehicle width direction, of each side-wall trim 25 and protrudes inwardly. Further, each restraint portion 40 has a flat contact face 41 at its front side (a lower side in the state shown in FIG. 1). This contact face 41 of the restraint portion 40 contacts the board portion 36 when the lift gate 3 is fully open and the tonneau cover member 32 engages with the lift gate 3.

Further, the board portion 36 includes a pair of resin-made contact portions 42 at both end portions of a front edge portion thereof which contact the contact faces 41 of the pair of restraint portions 40 when the lift gate 3 is fully open and the tonneau cover member 32 engages with the lift gate 3. Each contact portion 42 is comprised of a rectangular plate-shaped member, an outside end portion of which projects outwardly from the board portion 36. An upper face of the outside end portion of the contact portion 42 contacts the contact face 41 of the restraint portion 40 when the lift gate 3 is fully open and the tonneau cover member 32 engages with the lift gate 3.

Next, operations and effects of the tonneau cover device 30 will be described referring to FIGS. 1-4.

The board portion 36 hangs down from the winding device 34 when the tonneau cover member 32 is wound up by the winding device 34. Meanwhile, when it is desired that the tonneau cover member 32 engages with the lift gate 3, as shown with a two-dotted broken line in FIG. 1, the board portion 36 hanging down from the winding device 34 is lifted upward, the tonneau cover member 32 is pulled backward out of the winding device 34, then the tonneau cover member 32 is connected to the lift gate 3.

As the lift gate 3 is opened in a state in which the tonneau cover member 32 engages with the lift gate 3, the rear end portion of the tonneau cover member 32 rises obliquely backward, so that the rear end portion of the cover body portion 35 is pulled obliquely rearward and upward. Consequently, as shown with a solid line in FIG. 1, the cover body portion 35 is pulled out of the winding device 34, and the baggage compartment 4 becomes fully open when the tonneau cover member 32 reaches its rising position.

Herein, as described above, the pair of restraint portions 40 formed at the inner face portion of the lift gate 3 restrains the rear-end side of the cover body portion 35 from moving obliquely upward and forward through the contact of the contact faces 41 thereof with the upper faces of the contact portions 42 of the board portion 36 to stop further obliquely upward-and-forward moving of the front-end side of the board portion 36. Accordingly, as shown with the solid line in FIG. 1, the shape of the tonneau cover member 32 changes to the substantially L shape in the vehicle side view, so that the both-side end portions of the cover body portion 35 goes away from the rear pillars 15 when the lift gate 3 is fully open. Thus, the tonneau cover member 32 can be properly prevented from interfering with the rear pillars 15. Consequently, it can be prevented that the tonneau cover device 30 gets broken.

Figure 4:
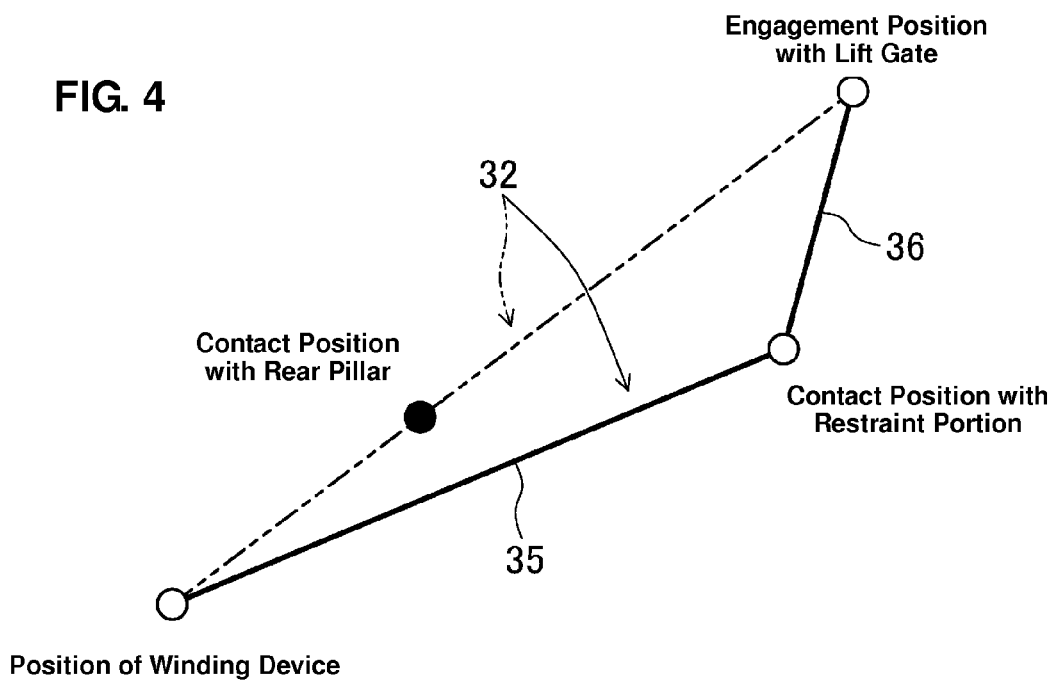
FIG. 4 is a side view schematically showing respective states of contact of the tonneau cover member with a rear pillar in both cases in which a restraint portion is formed at the lift gate and the restraint portion is not formed at the lift gate.

FIG. 4 is a side view schematically showing respective states of contact of the tonneau cover member 32 with the rear pillar 15 in both cases in which the restraint portion 40 is formed at the lift gate 3 and the restraint portion 40 is not formed at the lift gate 3. In the case in which the restraint portion 40 is not formed at the lift gate 3, as shown with a two-dotted broken line in FIG. 4, the shape of the tonneau cover member 32 is the substantially straight line when the lift gate 3 is fully open, so that the cover body portion 35 comes to contact the rear pillar 15. However, in the case in which the restraint portion 40 is formed at the lift gate 3 like the present embodiment described above, as shown with a solid line in FIG. 4, the board portion 36 comes to contact the restraint portion 40 when the lift gate 3 is fully open, so that the shape of the tonneau cover member 32 changes to the substantially L shape. Accordingly, the cover body portion 35 goes away from the rear pillars 15 properly, thereby does not come to contact the rear pillar 15.

Meanwhile, as the lift gate 3 is closed in the state in which the tonneau cover member 32 engages with the lift gate 3, the tonneau cover member 32 moves to its lowering position, so that it extends horizontally as shown with the two-dotted broken line in FIG. 1, covering over the baggage compartment 4.

As described above, according to the present embodiment, when the lift gate 3 is fully open and the tonneau cover member 32 engages with the lift gate 3, the board portion 36 contacts the restraint portions 40 provided at the specified position of the both end portions of the inner face of the lift gate 3 which are located above the engaged portions 3a to stop further upward moving of the board portion 36, thereby restraining the cover body portion 35 from moving upward. Accordingly, the shape of the tonneau cover member 32 changes to the substantially L shape in the vehicle side view when the lift gate 3 is fully open, so that the cover body portion 35 goes away from the rear pillars 15. Thus, the tonneau cover member 32 can be properly prevented from interfering with the rear pillars 15 when the lift gate 3 is fully open with the simple structure.

Further, since the restraint portion 40 is the protruding portion integrally formed at the lift gate trim, forming and appearances of the restraint portion 40 can be improved.

Moreover, since the resin-made contact portions 42 provided at the both end portions of the board portion 36 contact the above-described restraint portions 40 to stop further upward moving of the board portion 36, thereby restraining the cover body portion 35 from moving upward, a stable contact-strength can be provided by the resin-made contact portions 42 having a relatively high rigidity so that the upward-moving restraint of the cover body portion 35 can be stabilized.

The present invention should not be limited to the above-described embodiment and modification, and any other further modifications or improvements may be applied within the scope of a sprit of the present invention.

For example, while the engaged portions 3a are provided near the lower edge of the lift gate window of the lift gate 3 in the above-described embodiment, they may be provided at a specified position of the lift gate 3 which is located below and away from the lower edge of the lift gate window or at any other position.

Also, while the board portion 36 is made from resin in the above-described embodiment, it may be of a hardened felt material or any other material as long as the board portion 36 is hard enough to form its shape properly.

Further, while the restraint portion 40 is the protruding portion integrally formed at the lift gate trim in the above-described embodiment, it may be any portion which is separately formed from the lift gate 3 or the like. Herein, the above-described protruding portion is preferable from aspects of improving forming and appearances of the restraint portion 40.

Moreover, while the resin-made contact portion 42 formed at the board portion 36 contacts the restraint portion 40 in the above-described embodiment, the board portion 36 itself may contact the restraint portion 40.

What is claimed is:

1. A rear baggage-compartment structure of a vehicle, comprising:
    a baggage compartment provided at a vehicle-body rear portion;
    an opening portion formed at a vehicle-body rear face;
    a lift gate pivotally supported at an upper edge of the opening portion so as to close or open the opening portion;
    a tonneau cover member provided so as to cover the baggage compartment from above; and
    a winding device provided behind a rearmost-row seat and extending in a vehicle width direction, the winding device being operative to wind up the tonneau cover member,
    wherein said lift gate includes an engaged portion at an inner face thereof, said tonneau cover member comprises a cover body portion and a board portion which is connected to a rear end of said cover body portion and has a rear end portion thereof capable of engaging with said engaged portion of the lift gate, and said lift gate further includes a pair of restraint portions at a specified position of both end portions of the inner face thereof which is located above said engaged portion, the pair of restraint portions being operative to restrain said cover body portion of the tonneau cover member from moving upward when the lift gate is fully open and the tonneau cover member engages with the lift gate through a contact thereof with said board portion of the tonneau cover member to stop further upward moving of the board portion.

2. The rear baggage-compartment structure of a vehicle of claim 1, wherein said restraint portion is a protruding portion integrally formed at a lift gate trim.

3. The rear baggage-compartment structure of a vehicle of claim 1, wherein said board portion of the tonneau cover member includes a pair of resin-made contact portions at both end portions thereof which contacts said pair of restraint portions when the lift gate is fully open and the tonneau cover member engages with the lift gate.

4. The rear baggage-compartment structure of a vehicle of claim 2, wherein said board portion of the tonneau cover member includes a pair of resin-made contact portions at both end portions thereof which contacts said pair of restraint portions when the lift gate is fully open and the tonneau cover member engages with the lift gate.

* * * * *